(12) United States Patent
Brant et al.

(10) Patent No.: US 8,198,373 B2
(45) Date of Patent: Jun. 12, 2012

(54) PLASTIC TOUGHENED PLASTICS

(75) Inventors: Patrick Brant, Seabrook, TX (US);
Bryan R. Chapman, Annandale, NJ (US); Narayanaswami Raja Dharmarajan, Houston, TX (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 190 days.

(21) Appl. No.: 11/541,768

(22) Filed: Oct. 2, 2006

(65) Prior Publication Data

US 2010/0125118 A1    May 20, 2010

(51) Int. Cl.
*C08L 23/04* (2006.01)
*C08L 23/10* (2006.01)

(52) U.S. Cl. ........................ 525/240; 525/191
(58) Field of Classification Search .................. 525/191, 525/240
See application file for complete search history.

(56) References Cited

U.S. PATENT DOCUMENTS

| | | | |
|---|---|---|---|
| 4,087,485 A * | 5/1978 | Huff .............................. 525/193 |
| 4,543,399 A | 9/1985 | Jenkins, III et al. |
| 4,588,790 A | 5/1986 | Jenkins, III et al. |
| 4,808,561 A | 2/1989 | Welborn, Jr. |
| 5,017,714 A | 5/1991 | Welborn, Jr. |
| 5,028,670 A | 7/1991 | Chinh et al. |
| 5,055,438 A | 10/1991 | Canich |
| 5,064,802 A | 11/1991 | Stevens et al. |
| 5,124,418 A | 6/1992 | Welborn, Jr. |
| 5,153,157 A | 10/1992 | Hlatky et al. |
| 5,290,886 A | 3/1994 | Ellul |
| 5,317,036 A | 5/1994 | Brady, III et al. |
| 5,324,800 A | 6/1994 | Welborn, Jr. et al. |
| 5,352,749 A | 10/1994 | DeChellis et al. |
| 5,382,630 A | 1/1995 | Stehling et al. |
| 5,382,631 A | 1/1995 | Stehling et al. |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,502,124 A | 3/1996 | Crowther et al. |
| 5,504,049 A | 4/1996 | Crowther et al. |
| 5,571,864 A | 11/1996 | Bates et al. |
| 5,616,661 A | 4/1997 | Eisinger et al. |
| 5,668,228 A | 9/1997 | Chinh et al. |
| 5,723,546 A | 3/1998 | Sustic |
| 5,851,945 A | 12/1998 | Turner et al. |
| 6,294,495 B1 | 9/2001 | Matsunaga |
| 6,342,566 B2 | 1/2002 | Burkhardt et al. |
| 6,376,410 B1 | 4/2002 | Burkhardt et al. |
| 6,380,122 B1 | 4/2002 | Kuchta et al. |
| 6,384,142 B1 | 5/2002 | Burkhardt et al. |
| 6,910,343 B2 | 6/2005 | Ozaki et al. |
| 2002/0004575 A1 | 1/2002 | Cozewith et al. |
| 2004/0062942 A1* | 4/2004 | Lustiger et al. ............... 428/523 |
| 2005/0222327 A1* | 10/2005 | Botros et al. ................... 525/64 |
| 2005/0222338 A1* | 10/2005 | Sinoy et al. .................. 525/240 |

FOREIGN PATENT DOCUMENTS

| | | |
|---|---|---|
| EP | 0 620 251 | 10/1994 |
| EP | 0 816 384 | 1/1998 |
| WO | WO 93/03093 | 2/1993 |
| WO | WO 96/11960 | 4/1996 |
| WO | WO 96/11961 | 4/1996 |
| WO | WO 96/23010 | 8/1996 |
| WO | WO 96/27439 | 9/1996 |
| WO | WO 97/48735 | 12/1997 |
| WO | WO 00/11078 | 3/2000 |
| WO | WO 01/98409 | 12/2001 |

OTHER PUBLICATIONS

Yu, T.C., "Metallocene Plastomer Modification of Polypropylenes," Polymer Engineering and Science, Apr. 2001, vol. 41, No. 4, pp. 656-671.
Impact Modification of Polypropylene with Exact™ Plastomers, Society of Plastics Engineers, 1994, pp. 2439-2441.
R.F. Becker et al., Additives, Polypropylene Handbook, Chapter 4, 2nd Ed., Hanser Publishers, 2005, pp. 177-210.

* cited by examiner

*Primary Examiner* — Irina S Zemel
*Assistant Examiner* — Jeffrey Lenihan

(57) ABSTRACT

Plastic toughened plastics include a polymer composition having a polypropylene component and a second polymer component. The polypropylene component is present in an amount from about 50 to about 95 weight percent based on the total weight of the blend. The second polymer component is present in an amount from about 5 to about 50 weight percent based on the total weight of the blend, is a BOCD or BCD blend of at least two ssPE components, and has an overall density greater than about 0.90 g/cm$^3$. Optionally, the plastic toughened plastics include one or more third polymer component selected from propylene-olefin elastomers and ethylene-propylene rubbers, which are present in an amount from about 1 to about 50 weight percent, based on the total weight of the blend.

25 Claims, 2 Drawing Sheets

PLASTIC TOUGHENED PLASTICS

FIELD OF THE INVENTION

This invention relates generally to polyolefin plastics toughened by other polyolefin plastics. More specifically, this invention is directed toward polypropylene(s) toughened with at least a blend of two polyethylenes.

BACKGROUND OF THE INVENTION

Polypropylene is a versatile and widely used thermoplastic. Many of its uses are in applications that take advantage of its excellent physical properties in molded shapes. However, while polypropylene has outstanding stiffness (i.e., tensile and flex properties), it often fails in a brittle mode on impact, especially at sub-ambient temperatures, and so for many applications it is desirable to increase its toughness. At the same time, it is often desirable to maintain a minimum level of stiffness, such as for automotive parts, which frequently need to be both stiff (high flexural modulus) and tough (high energy-to-break under impact and/or tensile deformation).

To mitigate the brittle nature of polypropylene, and therefore improve its impact resistance and tensile toughness, softer (less crystalline) polymers are often added to polypropylene. These softer polymers include ethylene elastomers such as ethylene-propylene rubber ("EPR") or ethylene-propylene-diene monomer rubber ("EPDM"), which are generally characterized by from about 0 to about 10% crystallinity and a density below 0.86 g/cm$^3$. Ethylene/α-olefin copolymers involving higher α-olefins such as butene, hexene, octene and the like have been also been used either in conjunction with, or in place of, EPR or EPDM. These ethylene copolymers—also known as "plastomers"—generally have a crystallinity ranging from about 5 to about 40%, high extractability, and a density in the range of 0.86 to 0.92 g/cm$^3$. Ethylene-butene plastomers, in particular, have been added to impact modify polypropylene. For example, the advantageous use of ethylene-butene plastomers having an upper density limit of 0.910 g/cm$^3$ are described in "Impact Modification of Polypropylene with Exact™ Plastomers" (Society of Plastics Engineers, 1994). However, soft polymeric impact modifiers inevitably tend to reduce the stiffness, or rigidity, of the polypropylene polymers that they toughen. An additional drawback of PP/EPR or PP/EPDM or PP/plastomer blends is cost. Typically, EPR, EPDM, and plastomer are each more expensive than polypropylene.

Therefore, there is a need for a polypropylene blend that improves the stiffness-toughness balance of the blend as compared to previously disclosed polypropylene blends. There is also a need for a polypropylene blend that retains or improves the stiffness-toughness balance of the blend as compared to previously disclosed polypropylene blends, and costs less than previously disclosed polypropylene blends. These blends will be especially useful in molded parts, and more particularly useful in interior and exterior parts of vehicles, such as trucks, passenger automobiles, boats and the like.

SUMMARY OF THE INVENTION

This invention relates to a polymer composition comprising:
a. a polypropylene component, wherein the polypropylene component is present in an amount from about 50 to about 95 weight percent; and
b. a second polymer component, wherein the second polymer component is present in an amount from about 5 to about 50 weight percent, wherein the second polymer component is a BOCD or BCD blend of at least two ssPE components, and wherein the overall density of the second polymer component is greater than about 0.90 g/cm$^3$, wherein the weight percents are based on the combined weight of the polypropylene component and the second polymer component.

DEFINITIONS

Figure 1:
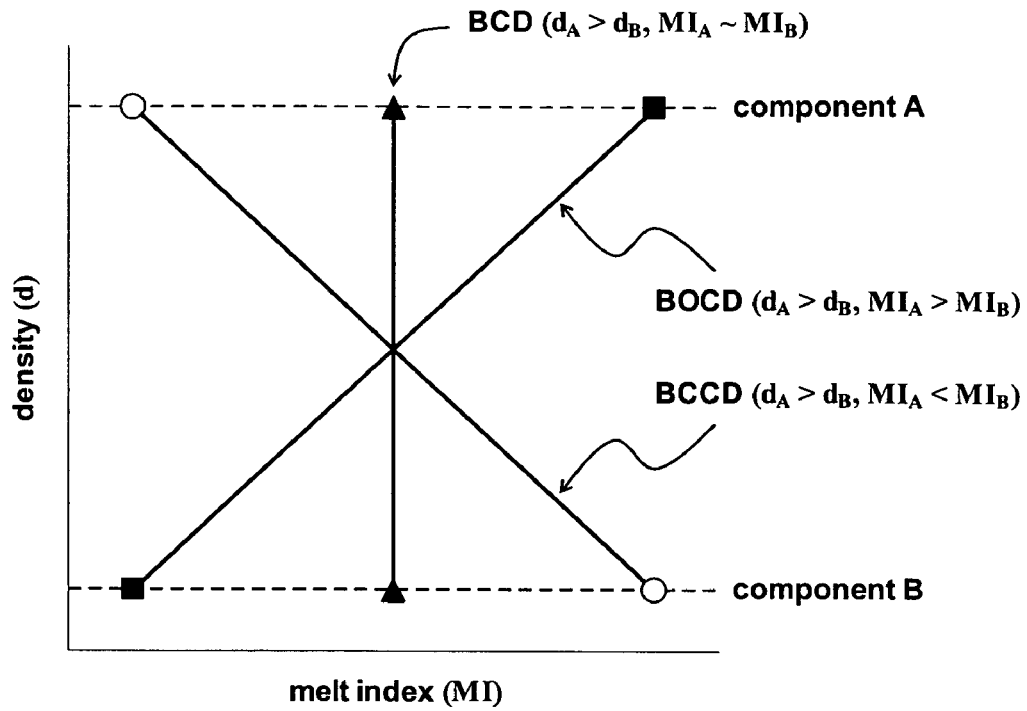
FIG. 1 illustrates the general density vs melt index relationships for Broad Conventional Composition Distribution ("BCCD"), Broad Orthogonal Composition Distribution ("BOCD"), and Broad Composition Distribution ("BCD") ethylene polymer blends.

For purposes of this invention, when a polymer is referred to as comprising an olefin, the olefin present in the polymer is the polymerized form of the olefin.

The term "copolymer" includes any polymer having 2 or more chemically distinct monomer types, and encompasses random copolymers, interpolymers, and block copolymers.

The term "polyolefin" means a polymer with at least 50 wt % of one or more olefin monomers chosen from ethylene, propylene, and α-olefins having carbon numbers of 4 to 20, and a weight-average molecular weight ($M_w$) of 20 kg/mol or more. Preferred polyolefins have at least 50 wt % (preferably at least 60 wt %, preferably at least 70 wt %, preferably at least 80 wt %, preferably at least 90 wt %, preferably at least 95 wt %, preferably 100 wt %) of one or more olefin monomers chosen from ethylene, propylene, and α-olefins having carbon numbers of 4 to 20, and a weight-average molecular weight ($M_w$) of 20 kg/mol or more (preferably 30 kg/mol or more, preferably 40 kg/mol or more, preferably 60 kg/mol or more, preferably 80 kg/mol or more, preferably 100 kg/mol or more).

The terms "polypropylene" and "propylene polymer" ("PP") mean a polyolefin comprising at least 50 wt % propylene units); having a peak melting point of 100° C. or more; and comprising less than 35 wt % ethylene units. Thus, a polypropylene, as it is defined here, can not be an EP Elastomer as defined below. The comonomers in a propylene copolymer are preferably chosen from among ethylene and $C_4$ to $C_{20}$ olefins, more preferably from among ethylene and $C_4$ to $C_8$ α-olefins. Specifically, the term polypropylene as used herein is meant to encompass so-called homopolypropylene ("hPP"), isotactic polypropylene ("iPP"), syndiotactic polypropylene ("sPP"), random copolymer polypropylene ("RCP"), and impact copolymer polypropylene ("ICP"). Preferred polypropylenes comprise at least 50 wt % (preferably at least 60 wt %, preferably at least 70 wt %, preferably at least 80 wt %, preferably at least 90 wt %, preferably at least 95 wt %, preferably 100 wt %) propylene units); have a peak melting point of 100° C. or more; and comprise less than 35 wt % ethylene units.

Terms "polyethylene" and "ethylene polymer" ("PE") mean a polyolefin comprising at least 50 wt % ethylene units;

and comprising less than 20 wt % propylene units. Thus, a polyethylene, as it is defined here, can not be an EP Elastomer as defined below. The comonomers in an ethylene copolymer are preferably chosen from among $C_3$ to $C_{20}$ olefins, more preferably from among propylene and $C_4$ to $C_8$ α-olefins. Specifically, the term polyethylene as used herein is meant to encompass high density polyethylene ("HDPE") having a density of greater than 0.94 g/cm$^3$; low-density polyethylene ("LDPE") having a density of greater than 0.91 to 0.94 g/cm$^3$, which includes linear low density polyethylene ("LLDPE") made using a heterogeneous catalysis process and polyethylenes in this density range made using a high-pressure/free radical process; ethylene plastomers having a density of 0.86 to 0.91 g/cm$^3$; and ethylene elastomers having a density of less than 0.86 g/cm$^3$. Preferred PE's are typically polyolefins comprising at least 50 wt % (preferably at least 60 wt %, preferably at least 70 wt %, preferably at least 80 wt %, preferably at least 90 wt %, preferably at least 95 wt %, preferably 100 wt %) of ethylene units and less than 20 wt % propylene units.

The term "single-site polyethylene" ("ssPE") means a PE resin produced using a single-site catalyst, that is, a catalyst for which the molecular arrangement responsible for olefin polymerization is the same for all catalysis sites. Suitable single-site catalysts include, for example, metal imido complexes, metallocene complexes, and other single-site catalysts, including those single-site catalysts that contain chromium. Non-limiting examples of single-site catalysts are described in the following references, which are herein fully incorporated by reference: EP-A2-0 816 384, WO 96/23010, WO 96/27439, WO 97/48735, U.S. Pat. Nos. 5,502,124; 5,504,049; 5,851,945; and 6,294,495. The prior art is replete with examples of metallocene catalysts/systems/complexes for producing polyethylene. Non-limiting examples of metallocene catalysts and catalyst systems useful in practicing the present invention include those described in, inter alia, WO 96/11961 and WO 96/11960, and in U.S. Pat. Nos. 4,808,561; 5,017,714; 5,055,438; 5,064,802; 5,124,418; 5,153,157; and 5,324,800. More recent examples include the catalysts and systems described in U.S. Pat. Nos. 6,380,122 and 6,376,410, and WO01/98409, and in the references cited therein, all of which are fully incorporated herein by reference. Typically, a ssPE will have a molecular weight distribution ($M_w/M_n$) of about 2, that is between 1.5 and 2.5, and in most cases between 1.8 and 2.3.

Figure 2:
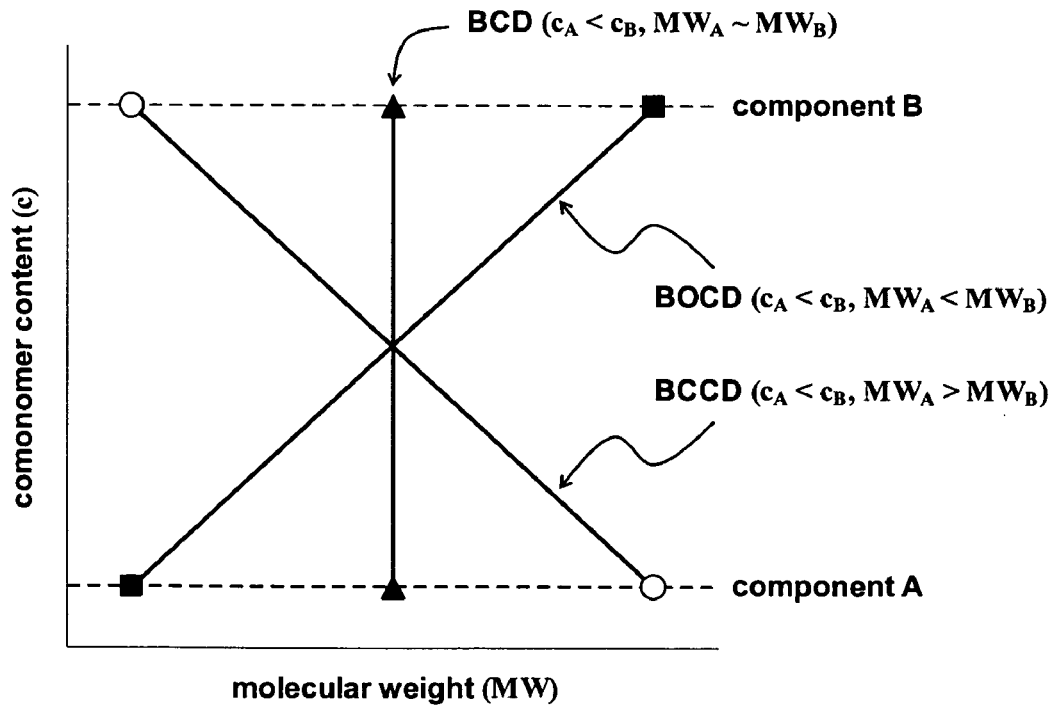
FIG. 2 illustrates the general comonomer content vs molecular weight relationships for BCCD, BOCD, and BCD ethylene polymer blends.

The term "broad conventional composition distribution" ("BCCD") describes a relationship between a blend of two ethylene polymers, wherein the ethylene polymer with the higher density has a lower melt index ("MI"). That is, BCCD blends follow the BCCD trend for density vs MI illustrated in FIG. 1. On a more fundamental level, since density increases with decreasing comonomer content and MI increases with decreasing molecular weight ("MW"), BCCD blends are also characterized by the BCCD trend for comonomer content vs MW illustrated in FIG. 2. For purposes of this invention, a blend of ethylene polymer A with ethylene polymer B is considered to be a BCCD blend if 1) both components are present at 5 wt % or more,
2) $d_A \geq d_B + x$, and
3) $MI_B/MI_A \geq y$, where $d_A$ is the density (measured or calculated from a correlation of density vs comonomer content) of ethylene polymer A, $d_B$ is the density (measured or calculated from a correlation of density vs comonomer content) of ethylene polymer B, $MI_A$ is the melt index (measured or calculated from a correlation of MI vs $M_w$) of ethylene polymer A, $MI_B$ is the melt index (measured or calculated from a correlation of MI vs $M_w$) of ethylene polymer B, x is 0.01 g/cm$^3$ or more, and y is 1.5 or more. An ethylene copolymer made using a Ziegler-Natta catalyst ("znPE") is known in the art to be a multicomponent BCCD blend, since there are multiple catalyst sites and those sites that make high molecular weight chains also incorporate less comonomer into those chains than sites that make low molecular weight chains (i.e., the polymerized chains tend to follow the BCCD trend illustrated in FIG. 2). Preferably, both components are present at 10 wt % or more, preferably 20 wt % or more, preferably 30 wt % or more. Preferably x is 0.02 g/cm$^3$ or more, preferably 0.03 g/cm$^3$ or more, preferably 0.04 g/cm$^3$ or more, preferably 0.05 g/cm$^3$ or more. Alternately x is 0.02 g/cm$^3$, preferably 0.03 g/cm$^3$, preferably 0.04 g/cm$^3$, preferably 0.05 g/cm$^3$. Preferably y is 2 or more, preferably 5 or more, preferably 10 or more, preferably 20 or more, preferably 50 or more, preferably 100 or more. Alternately y is 2, preferably 5, preferably 10, preferably 20, preferably 50, preferably 100. In the event the density measurements are different from the value calculated from a correlation of density vs comonomer content, the measurement shall be used. In the event the melt index measurements are different from the value calculated from a correlation of MI vs $M_w$), the measurement shall be used.

The term "broad orthogonal composition distribution" ("BOCD") describes a relationship between a blend of two ethylene polymers, wherein the ethylene polymer with the higher density has a higher melt index. That is, BOCD blends follow the BOCD trend for density vs MI illustrated in FIG. 1, as well as the BOCD trend for comonomer content vs MW illustrated in FIG. 2. For purposes of this invention, a blend of ethylene polymer A with ethylene polymer B is considered to be a BOCD blend if 4) both components are present at 5 wt % or more,
5) $d_A \geq d_B + x$, and
6) $MI_A/MI_B \geq y$, where $d_A$, $d_B$, $MI_A$, $MI_B$, x, and y are as defined above. Preferably, both components are present at 10 wt % or more, preferably 20 wt % or more, preferably 30 wt % or more.

The term "broad composition distribution" ("BCD") describes a relationship between a blend of two ethylene polymers, wherein the densities are different but the MIs are comparable. A blend of ethylene polymer A with ethylene polymer B is considered to be a BCD blend if 7) both components are present at 5 wt % or more,
8) $d_A \geq d_B + x$, and
9) $MI_A/MI_B < z$ and $MI_B/MI_A < z$, where $d_A$, $d_B$, $MI_A$, $MI_B$, and x are as defined above), and z is 2 or less. Preferably, both components are present at 10 wt % or more, preferably 20 wt % or more, preferably 30 wt % or more. Preferably z is 1.5 or less, preferably 1.2 or less, preferably 1.1 or less. Alternately z is 2, 1.5, 1.2 or 1.1.

The term "EP Elastomer" means a copolymer of ethylene and propylene, and optionally $C_4$ to $C_{20}$ diene monomer(s) where the ethylene content is from 35 to 80 wt %, the diene content is 0 to 15 wt %, and the balance is propylene with a minimum propylene content of 20 wt %; and where the copolymer has a Mooney viscosity, ML(1+4) @ 125° C. (measured according to ASTM D 1646) of 15 to 100. EPR and EPDM are considered EP Elastomers.

The term "propylene-olefin elastomer" means a copolymer of propylene with one or more olefin comonomer selected from ethylene and $C_4$ to $C_{20}$ α-olefins, where the propylene content is 60 to 95 wt % and the olefin comonomer content is less than 35 wt %, and optionally containing up to 15 wt % of $C_4$ to $C_{20}$ diene monomer(s); and where the heat of fusion is less than 45 J/g, the peak melting point is 90° C. or less, $M_n$ is between 40 and 400 kg/mol, and $M_w/M_n$ is between 1.5 and 5.

Preferably the propylene-olefin elastomer is a copolymer of propylene with one or more olefin comonomer selected from ethylene and $C_4$ to $C_{20}$ α-olefins (such as, for example, 1-butene, 4-methyl-1-pentene, 1-hexene, 1-octene, or 1-decene), preferably ethylene and/or 1-butene, where the propylene content is 60 to 95 wt % (preferably 70 to 92 wt %, preferably 75 to 90 wt %) and the olefin comonomer content is less than 35 wt % (preferably less than 30 wt %, preferably less than 25 wt %), and optionally containing up to 15 wt % of $C_4$ to $C_{20}$ diene monomer(s); and where the heat of fusion is less than 45 J/g (preferably less than 40 J/g, preferably less than 35 J/g), the peak melting point is 90° C. or less (preferably 80° C. or less, preferably 70° C. or less), $M_n$ is between 40 and 400 kg/mol, and $M_w/M_n$ is between 1.5 and 5.

For purpose of this invention and the claims thereto, unless otherwise noted, the following testing protocols shall be used for the indicated property:

| | |
|---|---|
| Melt Flow Rate (MFR): | ASTM D 1238 (230° C./2.16 kg) |
| Melt Index (MI): | ASTM D 1238 (190° C./2.16 kg) |
| Density | ASTM D 1505-03 |
| Injection Molding: | ASTM D 4101 |
| Test Specimen Conditioning: | ASTM D 618, Procedure A |
| Tensile Properties: | ASTM D 638 |
| Flexural Properties: | ASTM D 790 |
| Notched Izod Impact: | ASTM D 256, Method A (or Method E if "reversed notch" is noted) |
| Instrumented Impact: | ASTM D 3763 |
| Extractability: | Xylene; 21 CFR 177.1520 (d) (4) (i) |
| Melting Point ($T_m$) | DSC (see Experimental section) |
| Heat of Fusion ($H_f$) | DSC (see Experimental section) |
| Crystallinity (%) | DSC (see Experimental section) |
| Glass Transition Temperature ($T_g$) | DMTA (see Experimental section) |

For the purposes of this application, molecular weight is determined according to the gel permeation chromatography ("GPC") method described in ASTM D6474-99, including the weight-average molecular weight ("$M_w$") and the number-average molecular weight ("K"), given by:

$$M_w = \frac{\sum_i n_i M_i^2}{\sum_i n_i M_i}$$

$$M_n = \frac{\sum_i n_i M_i}{\sum_i n_i}$$

where $n_i$ is the number fraction of molecules of molecular weight $M_i$. The molecular weight distribution ("MWD") is defined to be $M_w/M_n$.

For purpose of this invention and the claims thereto, Composition Distribution Breadth Index ("CDBI") of a copolymer is measured according the procedure described in U.S. Pat. No. 5,382,630 (including that weight fractions of less than $M_w$=20,000 g/mol are ignored).

All percentages are by weight unless otherwise noted or indicated by the context.

DETAILED DESCRIPTION OF THE INVENTION

These and other aspects, features and advantages of the present invention will become better understood with regard to the following description, appended claims and accompanying drawings, where:

In certain embodiments, the plastic toughened plastics described herein include blends of at least two polymer components. The first polymer component is at least a polypropylene ("PP") and the second polymer component is a BOCD blend of at least two single-site-catalyzed polyethylenes ("ssPEs"). In an alternative embodiment, the plastic toughened plastics described herein include blends of at least three polymer components. The first polymer component is at least a PP; the second polymer component is a BOCD blend of at least two ssPEs; and the third polymer component is at least one propylene-olefin elastomer.

In another embodiment, the plastic toughened plastics described herein include blends of at least two polymer components; wherein the first polymer component is at least one PP and the second polymer component is a BCD blend of at least two ssPEs. In yet another embodiment, the plastic toughened plastics described herein include blends of at least three polymer components; wherein the first polymer component is at least one PP; the second polymer component is a BCD blend of at least two ssPEs; and the third polymer component is at least one propylene-olefin elastomer.

In another embodiment, the plastic toughened plastics described herein include blends of at least three polymer components; wherein the first polymer component is at least one PP; the second polymer component is a BOCD blend of at least two ssPEs; and the third polymer component is at least one EP elastomer. In yet another embodiment, the plastic toughened plastics described herein include blends of at least three polymer components; wherein the first polymer component is at least one PP; the second polymer component is a BCD blend of at least two ssPEs; and the third polymer component is at least one EP elastomer.

In another embodiment, the plastic toughened plastics described herein include blends of at least three polymer components; wherein the first polymer component is at least one PP; the second polymer component is a BOCD blend of at least two ssPEs; and the third polymer component comprises at least one EP elastomer and at least one propylene-olefin elastomer. In yet another embodiment, the plastic toughened plastics described herein include blends of at least three polymer components; wherein the first polymer component is at least one PP; the second polymer component is a BCD blend of at least two ssPEs; and the third polymer component comprises at least one EP elastomer and at least one propylene-olefin elastomer.

The following is a detailed description of certain preferred combinations of the polymer components, blends thereof, fabrication thereof into useful articles, and use of these articles. Those skilled in the art will appreciate that numerous modifications to these preferred embodiments may be made without departing from the scope of our invention. For example, while certain specific blends of iPP and ssPEs are exemplified, other blends are also contemplated. Additionally, while vehicle interior or exterior parts are discussed as uses for the blends, other uses, include but are not limited to, consumer product applications such as child car seats, produce crates, storage bins, children's toys, and small appliances such as vacuum cleaner housings, electric fan blades, etc., are also contemplated.

First Polymer Component

The first polymer component is one or more PP. In one embodiment of the present invention, at least one PP in the first polymer component is a homopolymer or copolymer, and includes hPP, iPP, sPP, and RCP. In another embodiment, at least one PP in the first polymer component is an ICP.

The first polymer component may exhibit isotactic polypropylene crystallinity resulting from predominantly isotactic propylene sequences, syndiotactic polypropylene crystallinity resulting from predominantly syndiotactic propylene sequences, or combinations of isotactic and syndiotactic polypropylene crystallinity. In some embodiments, the PP is predominantly isotactic, meaning the ratio of meso diad to racemic diads (m/r) measured by $^{13}$C-NMR is greater than 1.

The Melt Flow Rate ("MFR") of the PP may range from about 0.1 to about 1000 dg/min, or from about 1 to about 500 dg/min, or from about 10 to about 250 dg/min, or from about 10 to about 100 dg/min, or greater than about 15 dg/min, or greater than about 20 dg/min, or greater than about 25 dg/min, or greater than about 30 dg/min, or less than about 100 dg/min, or less than about 90 dg/min, or less than about 80 dg/min, or less than about 70 dg/min, or less than about 60 dg/min. The MFR may be optimized to fit the fabrication method and specific circumstances as seen fit by those of skill in this art.

The first polymer component may have a peak melting temperature ("$T_m$") of greater than about 100° C., or greater than about 110° C., or greater than about 120° C., or greater than about 130° C., or greater than about 140° C., or greater than about 150° C., or greater than about 160° C.

The first polymer component may have a heat of fusion greater than about 50 J/g, or greater than about 60 J/g, or greater than about 70 J/g, or greater than about 80 J/g, or greater than about 85 J/g, or greater than about 90 J/g, greater than about 95 J/g, greater than about 100 J/g, greater than about 120 J/g, or greater than about 140 J/g. Generally, the heat of fusion and melting temperature should be higher for the first polymer component than that of the third polymer component if present.

The first polymer component may have a number-average molecular weight ("Mn") in the range of from 20,000 to 5,000,000 g/mol.

The first polymer component is preferably a copolymer containing 0.2 to 20 mol % (preferably 0.5 to 15 mol %, preferably 1 to 10 mol %, preferably 2 to 5 mol %) of olefin comonomer selected from α-olefins with 4 to 12 carbon atoms and ethylene, based on the total weight of the polypropylene component. For example, the olefin or olefins may be one or more of ethylene, 1-butene, 4-methyl-1-pentene, 1-hexene-1, and 1-octene.

In one embodiment, the first polymer component has a melting point above 120° C. and is a random copolymer of propylene and up to 10 mol ethylene and/or 1-butene.

The blends of the present invention are preferably heterophase polymer compositions, meaning that there are at least two phases present: a continuous or matrix phase, and one or more discontinuous or dispersed phases distributed within the continuous phase. In preferred embodiments, the first polymer component is the continuous phase in the hetero-phase polymer composition.

The first polymer component may have an extractable level of up to 5 wt %, preferably up to 4 wt %, more preferably up to 3 wt %, more preferably up to 2 wt %.

The first polymer component blends will be present in the blend in the range of from about 50 to about 95 wt %, or from about 60 to about 90 wt %, or from about 65 to about 85 wt %, or from about 70 to about 85 wt %, or from about 70 to about 80 wt %, based on the total weight of the first, second, and third polymer components. Alternately, the first polymer component will be present in the blend in the range of from about 50 to about 95 wt %, or from about 60 to about 90 wt %, or from about 65 to about 85 wt %, or from about 70 to about 85 wt %, or from about 70 to about 80 wt %, based on the total weight of blend.

In a preferred embodiment of the present invention, the first polymer component is one or more impact copolymer polypropylene ("ICP"). Generally, an ICP is an "in-situ" (also known as an "in-reactor") blend comprising PP homopolymer or copolymer and EP Elastomer. Thus, a typical ICP contains at least two phases (the thermoplastic PP phase and the elastomeric EP Elastomer phase); however, an ICP may also comprise three phases such as a PP/EP/PE combination with the PP continuous and a dispersed phase with EP outside and PE inside the dispersed phase particles. These components are usually produced in a sequential polymerization process wherein PP component produced in a first reactor is transferred to a second reactor where the EP Elastomer component is produced and incorporated within the matrix of the PP component. A useful ICP is disclosed in, for example, U.S. Pat. No. 6,342,566 and U.S. Pat. No. 6,384,142.

In one embodiment, a suitable ICP comprises 50 to 95 wt % (preferably 60 to 90 wt %) of the PP component and 5 to 50 wt % (preferably 10 to 40 wt %) of the EP Elastomer component, based on the total weight of the ICP; wherein the PP component comprises 10 wt % or less ethylene, butene, hexene, or octene comonomer, and the EP Elastomer component comprises 35 to 70 wt % ethylene. Preferably, the ICP comprises less than 3 wt % (preferably less than 2 wt %, preferably less than 1 wt %) amorphous polypropylene.

In another embodiment, the ICP has one or more of the following properties: an MFR in the range of 0.2 to 200 dg/min (preferably 5 to 100 dg/min); and/or a peak melting point ($T_m$) of at least 145° C. (preferably at least 150° C., preferably at least 152° C., preferably at least 155° C.); and/or a 1% secant flexural modulus of 50 to 2500 MPa (preferably 100 to 2000 MPa, preferably 150 to 1800 MPa, preferably 200 to 1600 MPa, preferably 250 to 1400 MPa, preferably 300 to 1200 MPa).

In yet another embodiment, the EP Elastomer component of the ICP has one or more of the following properties: a heat of fusion of less than 30 J/g (preferably less than 20 J/g, preferably less than 10 J/g, preferably less than 5 J/g); and/or a weight average molecular weight ($M_w$) of at least 100 kg/mol (preferably at least 150 kg/mol, preferably at least 200 kg/mol); and/or a narrow molecular weight distribution ($M_w/M_n$) of less than 5 (preferably less than 4, preferably less than 3, preferably less than 2.5 (preferably greater than 1, preferably greater than 1.5); and/or an intrinsic viscosity (ASTM D 1601 in decalin at 135° C.) of greater than 1.0 dl/g (preferably greater than 1.5 dl/g, preferably greater than 2.0 dl/g).

Suitable impact copolymers are commercially available from ExxonMobil Chemical Company (Houston, Tex.), Dow Chemical Company (Freeport, Tex.), and Sunoco Chemical Company. Examples include:

|  | MFR (g/10 min) | Flexural Modulus (MPa) |
|---|---|---|
| ExxonMobil Chemical | | |
| AXO3B | 35 | 1270 |
| Exxpol Enhance 8224 | 27 | 1000 |
| PP7032 | 4-5 | 1100-1345 |
| PP7033 | 8 | 1120-1250 |
| PP7035 | 35 | 1100 |
| PP7414 | 20 | 1034 |
| PP7684 | 20 | 1290 |
| Dow Chemical | | |
| 7C12 | 22 | 1230 |
| 7C50 | 8 | 960 |

| | MFR (g/10 min) | Flexural Modulus (MPa) |
|---|---|---|
| C104 | 1.2 | 1240 |
| C700 | 35 | 1520 |
| C702 | 18 | 1035 |
| C783 | 3.8 | 1340 |
| Inspire D114 | 0.5 | 1260 |
| Sunoco Chemical | | |
| KN-501 | 8 | 1170 |
| MV-011 | 35 | 1170 |
| TI4005 | 0.5 | 1340 |
| TI4015 | 1.6 | 1240 |
| TI4040 | 4 | 1410 |
| TI4230 | 21 | 1070 |
| TI4350 | 35 | 1380 |
| TI4700 | 70 | 1310 |
| TI4900 | 115 | 1450 |

Second Polymer Component

The second polymer component is a blend of two or more ethylene polymers (PEs). At least two of the blended PEs which comprise the second polymer component must have a BOCD or BCD relationship with respect to each other. In BOCD blends, comonomer is distributed more heavily in a high molecular weight fraction of the resin, which is opposite from the comonomer distribution in resins made from Ziegler-Natta catalysts. For example, such blends of BOCD resins are generally disclosed in U.S. Pat. No. 5,382,630 to Stehling et al., which is incorporated by reference in full. In BCD blends, the comonomer distribution typically does not have a strong molecular weight dependence.

In one embodiment, the second polymer component is a blend of two or more ssPE. In another embodiment, the second polymer component is a blend of two or more single-site catalyst produced LLDPEs. In another embodiment, the second polymer component is a blend of a one or more single-site catalyst produced LLDPE and one or more single-site catalyst produced plastomer. In an alternative embodiment, the second polymer component is a blend of one or more ssPE and one or more znPE.

In yet further embodiments, the second polymer component comprises greater than two PE components, wherein at least two of the PE components are BOCD or BCD with respect to each other. For example, the second polymer component may comprise at least three PE components. In this embodiment, at least two of the three PE components are BOCD or BCD with respect to each other. In a still further example, the second polymer component comprises at least four PE components. In this embodiment, at least two of the four PE components are BOCD or BCD with respect to each other.

The second polymer component may have a heat of fusion in the range of from about 40 to about 180 J/g, or from about 50 to about 170 J/g, or from about 60 to about 160 J/g, or from about 70 to about 150 J/g, or from about 80 to about 140 J/g, or from about 90 to about 130 J/g.

In an embodiment, the aggregate density (also called overall density) of the second polymer component is greater than about 0.88 g/cm$^3$, alternatively greater than about 0.89 g/cm$^3$, alternatively greater than about 0.90 g/cm$^3$, alternatively greater than about 0.91 g/cm$^3$, alternatively greater than about 0.915 g/cm$^3$, alternatively greater than about 0.92 g/cm$^3$. Aggregate density or overall density means the density of the entirety of the second polymer component In an embodiment, at least one ssPE in the second polymer component has a density greater than about 0.92 g/cm$^3$ (preferably greater than about 0.93 g/cm$^3$, preferably greater than about 0.94 g/cm$^3$, preferably greater than about 0.95 g/cm$^3$); and/or comprises at least 97 mol % (preferably at least 98 mol %, preferably at least 99 mol %, preferably 100 mol %) ethylene.

The second polymer component may be an in-situ blend of at least two ssPEs. In an embodiment, the ssPEs used to make the second polymer component are produced in a single gas-phase reactor using more than one single-site catalyst. In an embodiment, the ssPEs used to make the second polymer component are produced in a single gas-phase reactor using one single-site catalyst but differing activators or other additives affecting the catalyst. In an alternative embodiment, the ssPEs are produced in separate reactors. In a further embodiment, at least one of the separate reactors used to make the separate ssPEs is a gas-phase reactor. The separate reactors may be arranged in either series or parallel. Gas-phase reactors are generally discussed in U.S. Pat. No. 4,543,399 to Jenkins et al.; U.S. Pat. No. 4,588,790 to Jenkins et al.; U.S. Pat. No. 5,028,670 to Chinh; U.S. Pat. No. 5,317,036 to Brady et al.; U.S. Pat. No. 5,352,749 to DeChellis; U.S. Pat. No. 5,405,922 to DeChellis; U.S. Pat. No. 5,436,304 to Griffin; U.S. Pat. No. 5,453,471 to Bernier; U.S. Pat. No. 5,462,999 to Griffin; U.S. Pat. No. 5,616,661 to Eisinger; U.S. Pat. No. 5,668,228 to Chinh; and U.S. Pat. No. 6,910,343 to Ozaki.

Alternatively, the second polymer component may be an ex-situ blend prepared using standard polymer processing equipment, such as single and twin screw extruders, static mixers, impingement mixers, or other machinery or process designed to disperse the components in intimate contact, and preferably a twin-screw extruder.

The second polymer component blends will be present in the blend in the range of from about 5 to about 50 wt %, or from about 10 to about 40 wt %, or from about 15 to about 40 wt %, or from about 3 to about 30 wt %, or from about 6 to about 24 wt %, or from about 7 to about 18 wt %, based on the total weight of the first, second, and third polymer components. Alternately, the second polymer component blends will be present in the blend in the range of from about 5 to about 50 wt %, or from about 10 to about 40 wt %, or from about 15 to about 40 wt %, or from about 3 to about 30 wt %, or from about 6 to about 24 wt %, or from about 7 to about 18 wt %, based on the total weight of the blend. In an embodiment, the amount of the second polymer component included in the inventive blend will be an effective amount to increase the tensile toughness and elongation of the inventive blends over similarly proportioned blend of first polymer component and znPE by the amounts stated herein, while not diminishing the modulus of the inventive blend below that of the similarly proportioned blends of first polymer component and znPE, preferably a znPE having the same density as the overall density of the second polymer component and or the same MI as the MI of the second polymer component. In fact, preferred blends may increase the modulus of the articles made therefrom by at least 5%, and preferably at least 7%, while still increasing the tensile toughness by the amounts discussed and maintaining the extractabilities at or below levels discussed herein.

Third Polymer Component

One or more third polymer components may be present in the blend. The third polymer components are selected from the group consisting of propylene-olefin elastomers, EP elastomers, and combinations thereof.

Propylene-Olefin Elastomers

Both the first polymer component and the propylene-olefin elastomer(s) may have isotactic sequences. The type of crystallinity, or lack thereof (isotactic, syndiotactic, atactic, ethylene), may be determined by NMR. For the propylene-olefin elastomer(s) the presence of isotactic sequences may be determined by NMR measurements showing two or more propylene derived units arranged isotactically. In the propylene-olefin elastomer(s), the isotactic sequences may be interrupted by units which are not isotactically arranged or by units that otherwise disturb the crystallinity derived from the isotactic sequences. The crystallinity of the propylene-olefin elastomer(s) may be from 2-65% or 5-40% of an identically treated isotactic polypropylene, as determined by DSC, where "identically treated" means (any steps taken with one sample are taken identically with the comparison sample, for example, annealing, and/or stresses introduced during fabrication and/or measurement).

Thus, the propylene-olefin elastomer(s) preferably has a heat of fusion of less than 45 J/g. The crystallinity interruption may be predominantly controlled by the incorporation of monomer units other than propylene, such as ethylene. In one embodiment, the propylene-olefin elastomer(s) may be a copolymer including from a lower limit of 5%, or 6%, or 8%, or 10% by weight to an upper limit of 20%, or 25%, or 30%, or 35% by weight ethylene-derived units, and from a lower limit of 65% or 70% by weight to an upper limit of 95%, or 94%, or 92%, or 90% by weight propylene-derived units, the percentages by weight based on the total weight of propylene- and ethylene-derived units. The copolymer may optionally contain diene-derived units.

The propylene-olefin elastomer(s) may include some or all of the following characteristics, where ranges from any recited upper limit to any recited lower limit are contemplated:
 a) a melting point, generally a single melting point, ranging from an upper limit of less than 110° C., or less than 105° C., or less than 90° C., or less than 80° C., or less than 70° C., to a lower limit of greater than 25° C., or greater than 35° C., or greater than 40° C., or greater than 45° C.;
 b) a heat of fusion ranging from a lower limit of greater than 1.0 joule per gram ("J/g"), or greater than 1.5 J/g, or greater than 4.0 J/g, or greater than 6.0 J/g, or greater than 7.0 J/g, to an upper limit of less than 45 J/g, or less than 40 J/g, or less than 35 J/g, or less than 30 J/g, or less than 25 J/g, or less than 20 J/g;
 c) a MWD ($M_w/M_n$) ranging from a lower limit of 1.5 or 1.8 to an upper limit of 40, or 20, or 10, or 5, or 3;
 d) a number average molecular weight of from 10,000-5,000,000 or from 40,000-300,000 or from 80,000-200,000, as determined by gel permeation chromatography (GPC); or
 e) a Mooney viscosity ML (1+4)@125° C. less than about 100 or less than about 75.

Suitable propylene-olefin elastomers typically have a propylene content of 50 to 92 wt %, or 70 to 90 wt %, or 75 to 90 wt %, based upon the weight of the copolymer.

The propylene-olefin elastomer may be isotactic, atactic, syndiotactic or combinations thereof. The tacticity should be adapted to ensure compatibility, especially relative to the first polymer component. In some embodiments, the tacticity of the first polymer component and the third polymer component may be substantially the same. By substantially, it is intended that these two components have at least 80, or 90, or 95, or 100% of the same tacticity. Even if the components are of mixed tacticity (i.e. partially isotactic and partially syndiotactic) the percentages in each should be at least 80% or greater the same as the other component.

The propylene-olefin elastomer may be co-crystallizable with the first polymer component. The co-crystallizability may be tested by comparing the DSC melting behavior before and after mixing samples of the first polymer component and the third polymer component. As co-crystallization occurs, both the melting point and glass transition temperature of the blend will begin to fall. The co-crystallization phenomenon can also be observed by studying the morphology at the interface of the propylene-olefin elastomer and the polypropylene component using Transmission Electron Microscopy (TEM). In a TEM view, in co-crystallized areas, either the components may appear as a single phase in the blend, or they may also appear as discrete phases with a high degree of interfacial and epitaxial crystallization between them.

In certain embodiments, at least 75% by weight, or at least 80% by weight, or at least 85% by weight, or at least 90% by weight, or at least 95% by weight, or at least 97% by weight, or at least 99% by weight of the propylene-olefin elastomer may be soluble in a single temperature fraction, or in two adjacent temperature fractions, with the balance of the copolymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences in propylene tacticity. Fractionations may also be conducted in boiling pentane, hexane, heptane and even di-ethyl ether.

In an alternative embodiment, the propylene-olefin elastomer has one or more of the following properties: a MFR of greater than about 0.1 dg/min, preferably greater than 0.5 dg/min, preferably 1 to 100 dg/min, preferably 2 to 80 dg/min, preferably 3 to 50 dg/min; and/or a heat of fusion of 3 to 45 J/g; and/or a 1% secant flexural modulus of less than 50 MPa; and/or a polydispersity ($M_w/M_n$) of less than 3; and/or a $T_m$ of 90° C. or less.

The propylene-ethylene elastomer has a crystalline portion and an amorphous portion, the amorphous portion being the result of stereo errors introduced by a catalyst and/or the amount and nature of a comonomer. These elastomers are more fully discussed in US 2002/0004575 A1.

In one embodiment, the propylene-olefin elastomer will be present in the blend in the range of from about 0 to about 10 wt %, or from about 1 to about 7 wt %, or from about 2 to about 5 wt %, based on the total weight of the first, second, and third polymer components. Alternately, the propylene-olefin elastomer will be present in the blend in the range of from about 0 to about 10 wt %, or from about 1 to about 7 wt %, or from about 2 to about 5 wt %, based on the total weight of the blend.

Commercially available examples of useful propylene-olefin elastomers include those sold under the Vistamaxx™ tradename by ExxonMobil Chemical and those sold under the Versify™ tradename by Dow Chemical.

EP Elastomers

In an embodiment, the EP Elastomer will be present in the blend in the range of from about 0 to about 50 wt %, or from about 2 to about 40 wt %, or from about 5 to about 30 wt %, based on the total weight of the first, second, and third polymer components. Alternately, the EP Elastomer will be present in the blend in the range of from about 0 to about 50 wt %, or from about 2 to about 40 wt %, or from about 5 to about 30 wt %, based on the total weight of the blend.

In an alternative embodiment the third component is the EP Elastomer of the ICP. In a still further embodiment the ICP is the first polymer component, and a second EP Elastomer and/or a propylene-olefin elastomer comprises the third component.

Other Ingredients

Other ingredients in our inventive blends include, but are not limited to: nucleating and clarifying agents; slip agents; pigments, colorants, dyes, and color masterbatches; antioxidants, antiozonants, antifogs, antistats, antiblocks, acid scavengers, stabilizers, neutralizers, anticorrosion agents, UV absorbers, quenchers, adjuvants; cavitating agents, blowing agents, surfactants; lubricants, plasticizers, synthetic or mineral oils, waxes, processing aids; cure agents such as peroxide; fillers such as talc, natural or synthetic clays, calcium carbonate, diatomaceous earth, carbon black, organic or inorganic solids, titanium dioxide, barium sulfate, silica, silicon dioxide, glass beads, mineral aggregates, wollastonite, and mica; fibers such as glass fibers, carbon fibers, and natural or synthetic polymer fibers; and combinations thereof. Typical additives used in polypropylene are described in N. Pasquini (Ed.): *Polypropylene Handbook*, $2^{nd}$ Ed. (Hamer Publishers, 2005).

In an embodiment, the blend comprises less than 1 wt % of the other ingredients, based on the total weight of the blend. In another embodiment, the blend comprises from about 0.1 wt % to about 1 wt % of the other ingredients, based on the total weight of the blend. In still another embodiment, the blend comprises from about 1 wt % to about 25 wt % (preferably from about 1 wt % to about 20 wt %, preferably from about 1 wt % to about 10 wt %, preferably from about 1 wt % to about 3 wt %) of the other ingredients, based on the total weight of the blend.

In a preferred embodiment, the blends produced herein have one or more of the following properties:
  (a) Notched Izod Impact resilience at 23° C. of 40 J/m or more, preferably 80 J/m or more, preferably 120 J/m or more, preferably a "no break"; and/or
  (b) Notched Izod Impact resilience at −18° C. of 30 J/m or more, preferably 60 J/m or more, preferably 90 J/m or more; and/or
  (c) Notched Izod Impact resilience at −30° C. of 20 J/m or more, preferably 40 J/m or more, preferably 60 J/m or more; and/or
  (d) Multiaxial Impact (ASTM D3763, 15 mph) failure mode for at least 20% of tested specimens is ductile at 23° C., preferably at −18° C., preferably at −30° C.; and/or
  (e) 1% Secant Flexural Modulus (1.27 min/min) of 300 to 3500 MPa, preferably 600 to 3000 MPa, preferably 900 to 2500 MPa; and/or
  (f) Tensile Young's Modulus (50.8 mm/min) of 400 MPa or more, preferably 800 MPa or more, preferably 1200 MPa or more; and/or
  (g) Tensile Strength (50.8 mm/min) of 8 MPa or more, preferably 12 MPa or more, preferably 16 MPa or more; and/or
  (h) Tensile Elongation at Yield (50.8 mm/min) of 4% or more, preferably 6% or more, preferably 8% or more; and/or
  (i) Tensile Elongation at Break (50.8 mm/min) of 200% or more, preferably 500% or more, preferably 800% or more; and/or
  (j) MFR (230° C., 2.16 kg) of 0.1 to 300 dg/min, preferably 1 to 150 dg/min, preferably 10 to 100 dg/min.

Fabrication and Post-Fabrication

The compositions of this invention may be used in any known application involving molding or extrusion, including consumer goods, industrial goods, construction materials, packaging materials, and automotive interior or exterior parts. Articles may be made or formed by any useful discrete molding or continuous extrusion means for forming and shaping polyolefins known in the art, including: compression molding, injection molding, co-injection molding, gas-assisted injection molding, blow molding, multi-layer blow molding, injection blow molding, stretch blow molding, extrusion blow molding, transfer molding; cast molding, rotational molding, foam molding, slush molding, transfer molding, wet lay-up or contact molding, cast molding, cold forming matched-die molding, thermoforming, vacuum forming, film blowing, film or sheet casting, sheet extrusion, profile extrusion or co-extrusion, fiber spinning, fiber spunbonding, fiber melt blowing, lamination, calendering, coating, pultrusion, protrusion, draw reduction, foaming, or other forms of processing such as described in, for example, PLASTICS PROCESSING (Radian Corporation, Noyes Data Corp. 1986), or combinations thereof. Use of certain processes, such as film casting and thermoforming, allows for the possibility of benefits from uniaxial or biaxial orientation of the inventive material.

Non-limiting examples of desirable articles of manufacture made from compositions of the invention include films, tapes, sheets, fibers, tubing, pipes, coatings, fabrics (woven and nonwoven), tarps, agricultural barriers, packaging (durable and disposable), household appliances (washing machines, refrigerators, blenders, air conditioners, vacuum cleaner housing, electric fan blades, etc.), furniture (indoor and outdoor, such as tables, chairs, benches, shelving, etc.), sporting equipment (skis, surfboards, skateboards, skates, boots, sleds, scooters, kayaks, paddles, etc.), solid wheels, stadium seating, amusement park rides, personal protective equipment (safety helmets, shin guards, etc.), emergency response equipment, cookware, utensils, trays, pallets, carts, tanks, tubs, pond liners, storage containers (crates, pails, jars, cases, produce storage bins, tubs, bins, bottles, etc.), toys, child car seats and booster chairs, medical devices, sportswear, luggage, tool housings (for drills, saws, etc.), electronics housings (for televisions, computers, phones, hand-held devices, media players, stereos, radios, clocks, etc.), building construction materials (flooring, siding, roofing, counter tops, electrical housings and connectors, etc.), lighting, gardening equipment (handles on shovels, wheelbarrows, etc.), playground equipment, motor housings, pump housings, battery housings, instrument housings, switches, knobs, buttons, handles, pet supplies, laboratory supplies, personal hygiene devices (razors, brushes, hairdryers, etc.), cleaning supplies (brooms, dust pans, etc.), musical instrument cases, statues, trophies, artwork, costume jewelry, picture frames, eyeglass frames, plant pots, firearm components, and automotive components.

Further non-limiting examples of desirable articles of manufacture made from compositions of the invention useful in vehicles (such as cars, trucks, buses, boats, all terrain vehicles, personal water craft, golf carts, snowmobiles, motorcycles, mopeds, tractors, mowers, wagons, bicycles, airplanes, helicopters, trains, military machines, gondolas, and the like) include: bumpers and bumper fascias; exterior body panels, door panels, and grills; exterior trim, including body side moldings, side cladding and molding, end caps, hoods, deck lids, mirror housings, roof racks, wheel covers, wheel liners, wheel flares, fender liners, hub caps, running boards, step pads, sill plates, air dams, splash shields, mud guards, bed liners, and rocker panels; fuel tanks; interior trim, including steering column covers, consoles, door panels, pillars, supports, knobs, buttons, handles, and safety screens; instrument panels and dash boards; knee bolsters; passenger side airbag covers; headliners; glove boxes, trays, cup holders, compartments, and lids; seat components, including backs, supports, and safety belt securing devices; under-hood applications, including battery trays and fan shrouds; electrical housings; cable bearings; and structural components, including door carriers, truck bed separators, load floors, and trunk dividers.

In another embodiment, this invention relates to:

1. A polymer composition comprising:
   a. a polypropylene component, wherein the polypropylene component is present in an amount from about 50 to about 95 weight percent; and
   b. a second polymer component, wherein the second polymer component is present in an amount from about 5 to about 50 weight percent, wherein the second polymer component is a BOCD or BCD blend of at least two ssPE components, and wherein the overall density of the second polymer component is greater than about 0.90 g/cm$^3$,
   wherein the weight percents are based on the combined weight of the polypropylene component and the second polymer component.

2. The polymer composition of paragraph 1, wherein the polypropylene component is selected from the group consisting of homopolypropylene, isotactic polypropylene, syndiotactic polypropylene, random copolymer polypropylene, impact copolymer polypropylene, and blends thereof, wherein the polypropylene component has at least about 50 weight percent propylene units, and less than about 35 weight percent ethylene units.

3. The polymer composition of paragraphs 1 or 2, wherein the polypropylene component is present in an amount from about 60 to about 90 weight percent.

4. The polymer composition of paragraphs 1 to 3, wherein the polypropylene component is present in an amount from about 65 to about 85 weight percent.

5. The polymer composition of paragraphs 1 to 4, wherein the second polymer component comprises a blend of at least two ssPE components, wherein $MI_A/MI_B \geq x$, wherein $MI_A$ is the melt index of a first ethylene polymer; $MI_B$ is the melt index of a second ethylene polymer; and x is between about 1.5 to about 5.

6. The polymer composition of paragraph 5, wherein x is between about 2 to about 3.

7. The polymer composition of paragraphs 5 or 6, wherein x is about 2.

8. The polymer composition of paragraphs 1 to 7, wherein the second polymer component is present in an amount from about 10 to about 40 weight percent.

9. The polymer composition of paragraphs 1 to 8, wherein the second polymer component is present in an amount from about 15 to about 45 weight percent.

10. The polymer composition of paragraphs 1 to 9, wherein the second polymer component has an overall density greater than about 0.91 g/cm$^3$.

11. The polymer composition of paragraphs 1 to 10, wherein the second polymer component has an overall density greater than about 0.915 g/cm$^3$.

12. The polymer composition of paragraphs 1 to 11, wherein the second polymer component comprises a blend of at least three PEs.

13. The polymer composition of paragraphs 1 to 12, wherein the second polymer component is an in-situ blend of the ssPEs.

14. The polymer composition of paragraphs 1 to 13, wherein at least one of the ssPEs is produced in a gas-phase reactor.

15. The polymer composition of paragraphs 1 to 14, wherein the second polymer component is an ex-situ blend of the ssPEs.

16. The polymer composition of paragraphs 1 to 15, wherein the blend further comprises from about 0.1 to about 10 weight percent of other ingredients, wherein the other ingredients are selected from the group consisting of nucleating and clarifying agents; slip agents; pigments, colorants, dyes, and color masterbatches; antioxidants, antiozonants, antifogs, antistats, antiblocks, acid scavengers, stabilizers, neutralizers, anticorrosion agents, UV absorbers, quenchers, adjuvants; cavitating agents, blowing agents, surfactants; lubricants, plasticizers, synthetic or mineral oils, waxes, processing aids; cure agents such as peroxide; fillers such as talc, natural or synthetic clays, calcium carbonate, diatomaceous earth, carbon black, organic or inorganic solids, titanium dioxide, barium sulfate, silica, silicon dioxide, glass beads, mineral aggregates, wollastonite, and mica; fibers such as glass fibers, carbon fibers, and natural or synthetic polymer fibers; and combinations thereof.

17. An article manufactured from the polymer composition of paragraphs 1 to 16, comprising about 70 weight percent of the polypropylene component and about 30 weight percent of the second polymer component, wherein the article has a yield strength of at least 25 MPa and a Notched Izod Impact Resilience @ −18° C. of at least about 30 N.

18. The article of paragraph 17, wherein the article has a Notched Izod Impact Resilience @ −18° C. of at least about 32 N.

19. An article manufactured from the polymer composition of paragraphs 1 to 16, wherein the article has about the same tensile toughness as a comparison article and a modulus at least 5% higher as a comparison article, wherein the comparison article is manufactured from a comparison blend comprising:
   a. an equal amount of the polypropylene component used in the article and
   b. a znPE that is present in an amount equal to the amount of second polymer component present in the article, (preferably where the znPE has the same density as the overall density of the second polymer component and or the same MI as the MI of the second polymer component).

20. The article of paragraph 19, wherein the modulus of the article is at least 7 percent higher than the modulus of the comparison article.

21. A polymer composition comprising:
   a. a polypropylene component, wherein the polypropylene component is present in an amount from about 50 to about 90 weight percent;
   b. a second polymer component, wherein the second polymer component is present in an amount from about 5 to about 40 weight percent, wherein the second polymer component is a BOCD or BCD blend of at least two ssPE components, and wherein the overall density of the second polymer component is greater than about 0.90 g/cm$^3$; and
   c. a third polymer component, wherein the third polymer component is present in an amount from about 1 to about 10 weight percent,
   wherein the weight percents are based on the combined weight of the polypropylene component, the second polymer component, and the third polymer component.

22. The polymer composition of paragraph 21, wherein the polypropylene component is selected from the group consisting of homopolypropylene, isotactic polypropylene, syndiotactic polypropylene, random copolymer polypropylene, impact copolymer polypropylene, and blends thereof, wherein the polypropylene component has at least about 50 weight percent propylene units, and less than about 35 weight percent ethylene units.

23. The polymer composition of paragraphs 21 or 22, wherein the polypropylene component is present in an amount from about 60 to about 90 weight percent.

24. The polymer composition of paragraphs 21 to 23, wherein the polypropylene component is present in an amount from about 65 to about 85 weight percent.

25. The polymer composition of paragraphs 21 to 24, wherein the second polymer component comprises a blend of at least two ssPE components, wherein $MI_A/MI_B \geq x$, wherein $MI_A$ is the melt index of a first ethylene polymer; $MI_B$ is the melt index of a second ethylene polymer; and x is between about 1.5 to about 5.

26. The polymer composition of paragraph 25, wherein x is between about 2 to about 3.

27. The polymer composition of paragraphs 25 to 26, wherein x is about 2.

28. The polymer composition of paragraphs 21 to 27, wherein the second polymer component is present in an amount from about 10 to about 40 weight percent.

29. The polymer composition of paragraphs 21 to 28, wherein the second polymer component is present in an amount from about 15 to about 45 weight percent.

30. The polymer composition of paragraphs 21 to 29, wherein the second polymer component has an overall density greater than about 0.915 g/cm³.

31. The polymer composition of paragraphs 21 to 30, wherein the second polymer component has an overall density greater than about 0.920 g/cm³.

32. The polymer composition of paragraphs 21 to 31, wherein the second polymer component comprises a blend of at least three PEs.

33. The polymer composition of paragraphs 21 to 32, wherein the second polymer component is an in-situ blend of the ssPEs.

34. The polymer composition of paragraphs 21 to 33, wherein at least one of the ssPEs is produced in a gas-phase reactor.

35. The polymer composition of paragraphs 21 to 34, wherein the second polymer component is an ex-situ blend of the ssPEs.

36. The polymer composition of paragraphs 21 to 35, wherein the third polymer component is present in an amount from about 1 to about 7 weight percent.

37. The polymer composition of paragraphs 21 to 36, wherein the third polymer component is present in an amount from about 2 to about 5 weight percent.

38. The polymer composition of paragraphs 21 to 37, wherein the third polymer component is a propylene-olefin elastomer.

39. The polymer composition of paragraphs 21 to 38, wherein the propylene-olefin elastomer comprises propylene sequences, and has a melting point less than 110° C., a heat of fusion less than 45 J/g, a $M_w/M_n$ from about 1.5 to about 40, a number average molecular weight of from about 10,000 to about 5,000,000, and a Mooney viscosity ML (1+4)@125° C. greater than 100.

40. The polymer composition of paragraphs 21 to 39, wherein the third polymer component is an EP elastomer.

41. The polymer composition of paragraphs 21 to 40, wherein the third polymer component comprises a propylene-olefin elastomer and an EP elastomer.

42. The polymer composition of paragraphs 21 to 41, wherein the blend further comprises from about 0.1 to about 10 weight percent of other ingredients, wherein the other ingredients are selected from the group consisting of nucleating and clarifying agents; slip agents; pigments, colorants, dyes, and color masterbatches; antioxidants, antiozonants, antifogs, antistats, antiblocks, acid scavengers, stabilizers, neutralizers, anticorrosion agents, UV absorbers, quenchers, adjuvants; cavitating agents, blowing agents, surfactants; lubricants, plasticizers, synthetic or mineral oils, waxes, processing aids; cure agents such as peroxide; fillers such as talc, natural or synthetic clays, calcium carbonate, diatomaceous earth, carbon black, organic or inorganic solids, titanium dioxide, barium sulfate, silica, silicon dioxide, glass beads, mineral aggregates, wollastonite, and mica; fibers such as glass fibers, carbon fibers, and natural or synthetic polymer fibers; and combinations thereof.

43. An article manufactured from the polymer composition of paragraphs 21 to 42, wherein the article has about the same tensile toughness as a comparison article and a modulus at least 5% higher as a comparison article, wherein the comparison article is manufactured from a comparison blend comprising:

a. an equal amount of the polypropylene component used in the article and b. a znPE that is present in an amount equal to the amount of second polymer component present in the article (preferably where the znPE has the same density as the overall density of the second polymer component and or the same MI as the MI of the second polymer component).

44. The article of paragraph 43, wherein the modulus of the article is at least 7 percent higher than the modulus of the comparison article.

EXAMPLES

Dynamic Mechanical Thermal Analysis ("DMTA"): The solid state linear viscoelastic properties are measured using a Rheometrics Solids Analyzer equipped with a dual cantilever test fixture. The specimen is cooled to −130° C. then heated to 60° C. at a heating rate of 2° C./min while subjecting to an oscillatory deformation at 0.1% strain and a frequency of 1 rad/sec. The output of these DMTA experiments is the storage modulus (E') and loss modulus (E"). The storage modulus measures the elastic response or the ability of the material to store energy, and the loss modulus measures the viscous response or the ability of the material to dissipate energy. The ratio of E"/E', called Tan-delta, gives a measure of the damping ability of the material; peaks in Tan-delta are associated with relaxation modes for the material. The glass transition temperature ($T_g$) is defined to be the peak temperature associated with the β-relaxation mode.

Differential Scanning Calorimetry ("DSC"): The general method followed is that of ASTM D 3417, except that in cases for pure EP Elastomer or propylene-ethylene elastomer the melting and enthalpy values are reported for the first heat. A Perkin Elmer DSC-7 is used for calorimetric studies. Material from the gage length of the tensile bar is heated from room temperature to 200° C. at a rate of 40° C./min. The melting temperature is taken as the temperature corresponding to the peak in heat flow during heating at 10° C./min; if multiple peaks were observed, it is taken to be the temperature corresponding to the highest-temperature peak. The enthalpy of melting (also called the heat of fusion) is obtained by integrating the heat flow curve to a flat baseline. The weight fraction crystallinity is calculated as:

$$Wc = \frac{\Delta H_{melt}}{f \Delta H_{melt}^{ideal}}$$

where $\Delta H_{melt}$ is the measured enthalpy of melting, $\Delta H_{melt}^{ideal}$ is the ideal enthalpy of melting for a perfect crystal of polymer X, and f is the weight fraction of polymer X in the blend. For polyolefins with ethylene crystallinity, $\Delta H_{melt}^{ideal}$=277

J/g, and for polyolefins with propylene crystallinity, $\Delta H_{melt}^{ideal}=165$ J/g. Degree of crystallinity (also called percent crystallinity) is 100 Wc.

PP Components used in Examples

PP 7715G Polypropylene impact copolymer from ExxonMobil Chemical (reactor granule version of PP 7715, nominal 35 dg/min MFR).

Achieve 3825 Polypropylene homopolymer from ExxonMobil Chemical (nominal 32 dg/min MFR).

Achieve 3854 Polypropylene homopolymer from ExxonMobil Chemical (nominal 24 dg/min MFR).

ssPE Components Used in Examples

Exceed 350D60 LLDPE from ExxonMobil Chemical (nominal 0.917 g/cm³ density, 1 dg/min MI) made using a metallocene catalyst and hexene comonomer in a gas-phase reactor.

Exceed 1012 vLDPE from ExxonMobil Chemical (nominal 0.912 g/cm³ density, 1 dg/min MI) made using a metallocene catalyst and hexene comonomer in a gas-phase reactor.

Exceed 321 vLDPE from ExxonMobil Chemical (nominal 0.912 g/cm³ density, 0.9 dg/min MI) made using a metallocene catalyst and hexene comonomer in a gas-phase reactor.

Exact 3132 Ethylene plastomer from ExxonMobil Chemical (nominal 0.90 g/cm³ density, 1.2 dg/min MI) made using a metallocene catalyst and hexene comonomer in a solution-phase reactor.

Exact 3125 Ethylene plastomer from ExxonMobil Chemical (nominal 0.91 g/cm³ density, 1.2 dg/min MI) made using a metallocene catalyst and butene comonomer in a solution-phase reactor.

Exact 3128 Ethylene plastomer from ExxonMobil Chemical (nominal 0.90 g/cm³ density, 1.2 dg/min MI) made using a metallocene catalyst and butene comonomer in a solution-phase reactor.

LL3001 LLDPE from ExxonMobil Chemical (nominal 0.917 g/cm³ density, 1 dg/min MI) made using a Ziegler-Natta catalyst and hexene comonomer in a gas-phase reactor.

LL1001 LLDPE from ExxonMobil Chemical (nominal 0.918 g/cm³ density, 1 dg/min MI) made using a Ziegler-Natta catalyst and butene comonomer in a gas-phase reactor.

PE Blend-1 In-situ BOCD blend (0.919 g/cm³ density, 1.0 dg/min MI) of 40 wt % HDPE (estimated 0.950 g/cm³ density, 125 dg/min MI) and 60 wt % LLDPE (estimated 0.900 g/cm³ density, 0.2 dg/min MI), made using a metallocene catalyst and hexene comonomer in a series configuration of two gas-phase reactors.

PE Blend-2 Extruder BCD blend (0.918 g/cm³ density, 1.0 dg/min MI) of 35 wt % HDPE (0.949 g/cm³ density, 0.9 dg/min MI) and 65 wt % LLDPE (0.901 g/cm³ density, 1.0 dg/min MI), each made using a metallocene catalyst and hexene comonomer in a gas-phase reactor, and combined by melt-mixing in an extruder.

PE Blend-3 Extruder BCD blend (0.917 g/cm³ density, 0.8 dg/min MI) of 50 wt % HDPE (0.950 g/cm³ density, 0.9 dg/min MI), made using a metallocene catalyst and hexene comonomer in a gas-phase reactor, and 50 wt % ethylene plastomer (0.882 g/cm³ density, 0.7 dg/min MI), made using a metallocene catalyst and butene comonomer in a solution-phase reactor, combined by melt-mixing in an extruder.

PE Blend-4 In-situ BCD blend (0.916 g/cm³ density, 0.5 dg/min MI) of about 20 wt % HDPE (estimated 0.94 g/cm³ density, 0.5 MI) and about 80 wt % LLDPE (estimated 0.91 g/cm³ density, 0.5 MI) made using two metallocene catalysts and hexene comonomer in a gas-phase reactor.

Propylene-Olefin Elastomer Components used in Examples

VM 6100 Propylene-ethylene copolymer from ExxonMobil Chemical (nominal 0.855 g/cm³ density, 3 dg/min MFR), made using a metallocene catalyst in a solution-phase reactor.

Example Set 1

Formulations 1-9

Table 1 shows blends of an ICP formulated with an metallocene-catalyzed BOCD PE (i.e., a second polymer component) and a propylene-ethylene elastomer. Additional additives include a light stabilizer, nucleating agent, and antioxidant. The formulations were melt compounded in a twin-screw extruder (with components added as a tumble blend into the extruder hopper), pelletized, and injection molded into test specimens.

Example Set 2

Formulations 10-19

Figure 3:
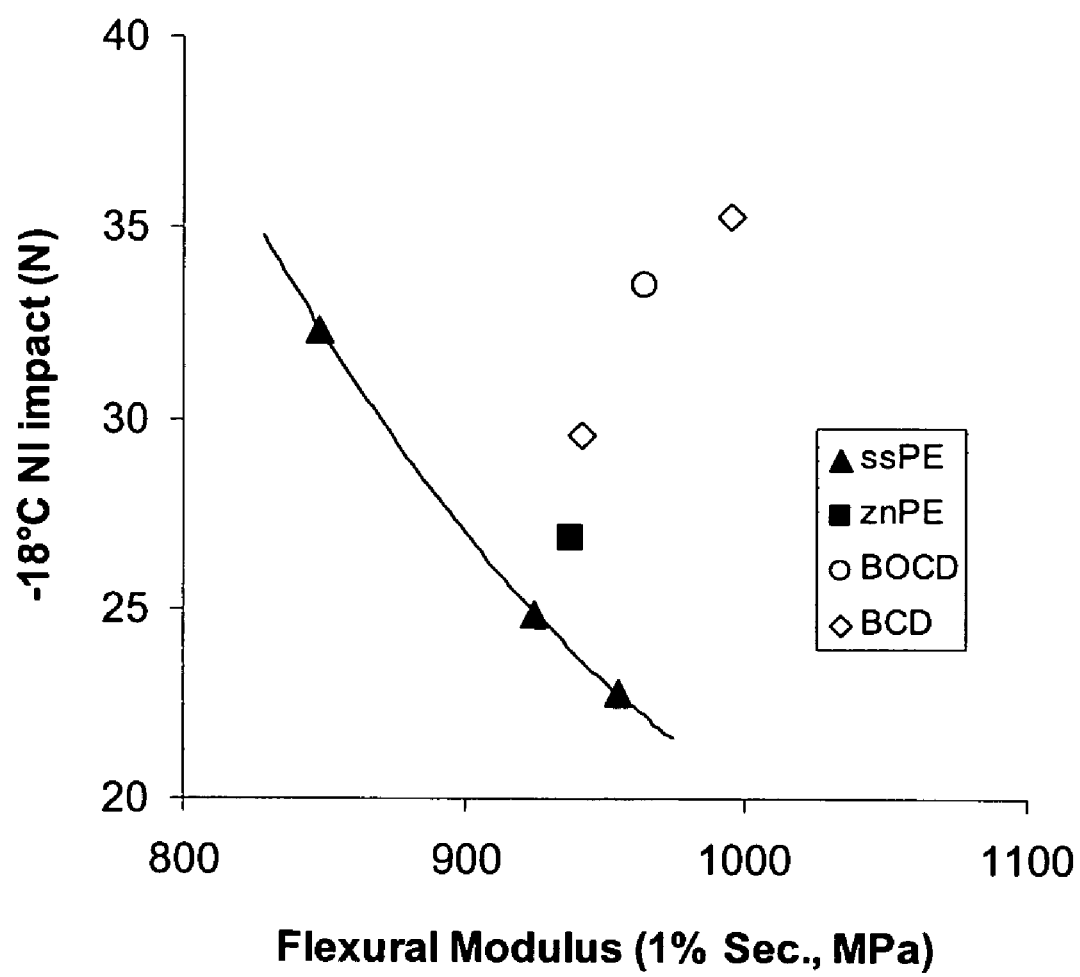
FIG. 3 illustrates the improvement in stiffness-toughness balance for PP toughened by the inventive PE blends over those toughened by conventional PE materials using Examples from Table 2.

Table 2 shows blends of an iPP polypropylene component formulated with either a single ssPE ethylene polymer or a znPE (i.e., BCCD) ethylene polymer in control examples 10-16, or with a BOCD or BCD blend of ssPEs (i.e., a second polymer component) in inventive examples 17-19. The formulations were melt compounded by two passes through a twin screw extruder, or one pass through a single-screw extruder followed by a second pass through a twin-screw extruder (with components added as a tumble blend into the extruder hopper), pelletized, and injection molded into test specimens. An improvement in the stiffness-toughness balance for the inventive blends over the control blends is demonstrated in FIG. 3.

Example Set 3

Formulations 20-21

Table 3 shows blends of an iPP polypropylene component formulated with a single ssPE in control example 20, or with a BCD blend of ssPEs (i.e., a second polymer component) in inventive example 21. The formulations were melt compounded by two passes through a twin-screw extruder (with components added as a tumble blend into the extruder hopper), pelletized, and injection molded into test specimens.

TABLE 1

| Examples: | 1 | 2 | 3 | 4 | 5 | 6 | 7 | 8 | 9 |
|---|---|---|---|---|---|---|---|---|---|
| Composition (parts by weight) | | | | | | | | | |
| PP 7715G | 89 | 87 | 84 | 86 | 84 | 81 | 83 | 81 | 78 |
| PE Blend-1 | 11 | 11 | 11 | 14 | 14 | 14 | 17 | 17 | 17 |
| VM 6100 | — | 2 | 5 | — | 2 | 5 | — | 2 | 5 |
| Ultranox 626 | 0.04 | 0.04 | 0.04 | 0.04 | 0.04 | 0.04 | 0.04 | 0.04 | 0.04 |

TABLE 1-continued

| Examples: | 1 | 2 | 3 | 4 | 5 | 6 | 7 | 8 | 9 |
|---|---|---|---|---|---|---|---|---|---|
| Sodium Benzoate | 0.09 | 0.09 | 0.08 | 0.09 | 0.08 | 0.08 | 0.08 | 0.08 | 0.08 |
| Irganox ™ 1010 | 0.13 | 0.13 | 0.13 | 0.13 | 0.13 | 0.12 | 0.12 | 0.12 | 0.12 |
| Notched Izod Impact Resilience | | | | | | | | | |
| @ 21° C. (J/m) | 96 | 139 | NB | 112 | 171 | NB | 123 | 246 | NB |
| @ −30° C. (J/m) | 53 | 53 | 49 | 53 | 64 | 53 | 59 | 64 | 64 |
| Instrumented Impact @ −30° C./15 mph | | | | | | | | | |
| Total Energy (J) | 25 | 39 | 27 | 38 | 44 | 37 | 45 | 50 | 50 |
| Failure Mode (B/BD/DB/D) | (0/4/1/0) | (1/0/3/1) | (2/1/1/1) | (0/2/2/1) | (0/1/2/2) | (0/2/0/3) | (0/1/1/3) | (0/1/1/3) | (0/0/0/5) |
| Flexural Properties @ 1.27 mm/min | | | | | | | | | |
| 1% Secant Modulus (MPa) | 1165 | 1076 | 986 | 1138 | 1041 | 917 | 1083 | 1020 | 917 |
| Tangent Modulus (MPa) | 1207 | 1103 | 1027 | 1165 | 1096 | 952 | 1124 | 1069 | 945 |
| Tensile Properties @ 50.8 in/min | | | | | | | | | |
| Young's Modulus (MPa) | 1448 | 1358 | 1186 | 1393 | 1386 | 1117 | 1338 | 1248 | 1138 |
| Yield Strength (MPa) | 23 | 22 | 21 | 22 | 21 | 20 | 22 | 21 | 20 |
| Elongation at Yield (%) | 4.6 | 5 | 5.8 | 4.5 | 5.1 | 6.3 | 4.7 | 5.4 | 6.4 |
| Elongation at Break (%) | 47 | 72 | 151 | 48 | 73 | 143 | 44 | 59 | 106 |
| MFR @ 230° C./2.16 kg (dg/min) | 24.0 | 25.5 | 24.9 | 26.9 | 24.6 | 22.2 | 24.5 | 22.9 | 22.1 |

NB = no break. Failure Mode: B—brittle, BD—brittle-ductile, DB—ductile-brittle, and D—ductile

TABLE 2

| Examples: | | C10 | C11 | C12 | C13 | C14 | C15 | C16 | 17 | 18 | 19 |
|---|---|---|---|---|---|---|---|---|---|---|---|
| Composition (weight %) | | | | | | | | | | | |
| Achieve 3825 | | 70 | 70 | 70 | 70 | 70 | 70 | 70 | 70 | 70 | 70 |
| Exceed 350D60 | ssPE, 0.917 g/cm³ | 30 | — | — | — | — | — | — | — | — | — |
| Exceed 321 | ssPE, 0.911 g/cm³ | — | 30 | — | — | — | — | — | — | — | — |
| Exact 3132 | ssPE, 0.900 g/cm³ | — | — | 30 | — | — | — | — | — | — | — |
| Exact 3125 | ssPE, 0.911 g/cm³ | — | — | — | 30 | — | — | — | — | — | — |
| Exact 3128 | ssPE, 0.901 g/cm³ | — | — | — | — | 30 | — | — | — | — | — |
| LL3001 | znPE, 0.917 g/cm³ | — | — | — | — | — | 30 | — | — | — | — |
| LL1001 | znPE, 0.917 g/cm³ | — | — | — | — | — | — | 30 | — | — | — |
| PE Blend-1 | BOCD, 0.919 g/cm³ | — | — | — | — | — | — | — | 30 | — | — |
| PE Blend-2 | BCD, 0.918 g/cm³ | — | — | — | — | — | — | — | — | 30 | — |
| PE Blend-4 | BCD, 0.916 g/cm³ | — | — | — | — | — | — | — | — | — | 30 |
| Notched Izod Impact Resilience | | | | | | | | | | | |
| @ 23° C. (N) | | 61 | 66 | 69 | 52 | 57 | 51 | 48 | 56 | 57 | 66 |
| @ 0° C. (N) | | 35 | 37 | 34 | 27 | 33 | 35 | 33 | 35 | 36 | 39 |
| @ −18° C. (N) | | 23 | 25 | 32 | 22 | 27 | 27 | 25 | 34 | 30 | 35 |
| Flexural Properties @ 1.27 mm/min | | | | | | | | | | | |
| 1% Secant Modulus (MPa) | | 955 | 925 | 848 | 898 | 837 | 938 | 935 | 965 | 941 | 995 |
| Tensile Properties @ 50.8 mm/min | | | | | | | | | | | |
| Young's Modulus (MPa) | | 1308 | 1180 | 1125 | 1135 | 965 | 1017 | 1062 | 1285 | 889 | 1049 |
| Yield Strength (MPa) | | 24.9 | 24.0 | 21.7 | 23.6 | 22.3 | 24.0 | 24.1 | 25.2 | 25.7 | 23.8 |
| Elongation at Yield (%) | | 10.2 | 10.4 | 11.1 | 10.9 | 11.5 | 11.3 | 10.9 | 9.8 | 10.7 | 9.8 |
| Elongation at Break (%) | | 637 | 742 | 518 | 208 | 238 | 634 | 369 | 789 | 706 | 1015 |
| Energy to Break (J) | | 266 | 278 | 179 | 83 | 163 | 205 | 117 | 273 | 273 | 387 |

"Energy to Break" is the total area under the tensile stress-strain curve.

TABLE 3

| Examples: | | C20 | 21 |
|---|---|---|---|
| Composition (weight %) | | | |
| Achieve 3854 | | 70 | 70 |
| Exceed 1012 | ssPE, 0.914 g/cm³, 1.0 MI | 30 | — |
| PE Blend-3 | BCD, 0.917 g/cm³, 0.8 MI | — | 30 |
| Notched Izod Impact Resilience | | | |
| @ 23° C. (N) | | 62 | 78 |
| @ −18° C., reversed notch (N) | | 555 | 559 |
| Flexural Properties @ 1.3 mm/min | | | |
| 1% Secant Modulus (MPa) | | 946 | 987 |
| Tensile Properties @ 50 mm/min | | | |
| Young's Modulus (MPa) | | 506 | 553 |
| Yield Strength (MPa) | | 23.8 | 25.3 |
| Elongation at Yield (%) | | 14.3 | 14.3 |
| Elongation at Break (%) | | ~1000 | 828 |

What is claimed is:

1. An injection molded article comprising a polymer composition comprising:
   a. a polypropylene component, wherein the polypropylene component has a Tm of 120° C. or more and a heat of fusion of greater than 50 J/g, and is present in an amount from about 50 to about 95 weight percent, based upon the combined weight of the polypropylene component, the second polymer component, and the third polymer component;
   b. a second polymer component, wherein the second polymer component is present in an amount from about 10 to about 40 weight percent, based upon the combined weight of the polypropylene component, the second polymer component, and the third polymer component, wherein the second polymer component is a BCD blend of at least 30 wt %, based upon the weight of the second polymer component, of at least, a first ssPE component having a density of greater than 0.940 g/cm³ and at least 30 wt %, based upon the weight of the second polymer component, of a second ssPE component, wherein the BCD blend has: a) a $MI_A/MI_B$<z and $MI_B/MI_A$<z and z is <2, $MI_A$ is the melt index of the first ssPE component, $MI_B$ is the melt index of the second ssPE component, b) a $d_A$ greater than or equal to $d_B$+x, where $d_A$ is the density the first ssPE component and dB is the density of the second ssPE component, and x=0.04 g/cm³ or more, and c) an overall density is greater than about 0.90 g/cm³; and
   c. a third polymer component, wherein the third polymer component is present in an amount from about 1 to about 10 weight percent, based upon the combined weight of the polypropylene component, the second polymer component, and the third polymer component,
and wherein the polymer composition has:
   (i) an MFR (230° C., 2.16 kg) of 10 to 100 dg/min,
   (ii) a 1% Secant Flexural Modulus of 900 to 3500 MPa,
   (iii) a yield strength of at least 25 MPa,
   (iv) a Notched Izod Impact Resilience at −18° C. of at least about 30 N, and
   (v) an elongation at break of 500% or more.

2. The molded article of claim 1, wherein the polypropylene component is selected from the group consisting of homo polypropylene, isotactic polypropylene, syndiotactic polypropylene, random copolymer polypropylene, impact copolymer polypropylene, and blends thereof, wherein the polypropylene component has at least about 50 weight percent propylene units, and less than about 35 weight percent ethylene units.

3. The molded article of claim 1, wherein the polypropylene component is present in an amount from about 60 to about 90 weight percent.

4. The molded article of claim 3, wherein the polypropylene component is present in an amount from about 65 to about 85 weight percent.

5. The molded article of claim 1, wherein z is ≦ about 1.5 for the BCD blend.

6. The molded article of claim 5, wherein z is ≦ about 1.2 for the BCD blend.

7. The molded article of claim 5, wherein z is ≦ about 1.1 for the BCD blend.

8. The molded article of claim 1, wherein the second polymer component is present in an amount from about 15 to about 40 weight percent.

9. The molded article of claim 1, wherein the second polymer component is present in an amount from about 15 to about 30 weight percent.

10. The molded article of claim 1, wherein the second polymer component has an overall density greater than about 0.915 g/cm³.

11. The molded article of claim 10, wherein the second polymer component has an overall density greater than about 0.920 g/cm³.

12. The molded article of claim 5, wherein the second polymer component comprises a blend of at least three PEs.

13. The molded article of claim 5, wherein the second polymer component is an in-situ blend of the ssPEs.

14. The molded article of claim 13, wherein at least one of the ssPEs is produced in a gas-phase reactor.

15. The molded article of claim 5, wherein the second polymer component is an ex-situ blend of the ssPEs.

16. The molded article of claim 1, wherein the third polymer component is present in an amount from about 1 to about 7 weight percent.

17. The molded article of claim 16, wherein the third polymer component is present in an amount from about 2 to about 5 weight percent.

18. The molded article of claim 1, wherein the third polymer component is a propylene-olefin elastomer.

19. The molded article of claim 18, wherein the propylene-olefin elastomer has propylene sequences, a melting point less than 110° C., a heat of fusion less than 45 J/g, a $M_w/M_n$ from about 1.5 to about 40, a number average molecular weight of from about 10,000 to about 5,000,000, and a Mooney viscosity ML (1+4)@125° C. greater than 100.

20. The molded article of claim 1, wherein the third polymer component is an EP elastomer.

21. The molded article of claim 1, wherein the third polymer component comprises a propylene-olefin elastomer and an EP elastomer.

22. The molded article of claim 1, wherein the blend further comprises from about 0.1 to about 10 weight percent of other ingredients, wherein the other ingredients are selected from the group consisting of nucleating and clarifying agents; slip agents; pigments, colorants, dyes, and color masterbatches; antioxidants, antiozonants, antifogs, antistats, antiblocks, acid scavengers, stabilizers, neutralizers, anticorrosion agents, UV absorbers, quenchers, adjuvants; cavitating agents, blowing agents, surfactants; lubricants, plasticizers, synthetic or mineral oils, waxes, processing aids; peroxide cure agents; talc, natural or synthetic clays, calcium carbonate, diatomaceous earth, carbon black, organic or inorganic solids, titanium dioxide, barium sulfate, silica, silicon dioxide, glass beads, mineral aggregates, wollastonite, and mica; glass fibers, carbon fibers, and natural or synthetic polymer fibers; and combinations thereof.

23. The molded article of claim 1, wherein the article has about the same tensile toughness as a comparison article and a 1% secant flexural modulus at least 5% higher than a comparison article, wherein the comparison article is manufactured from a comparison blend comprising:
   a. an equal amount of the polypropylene component used in the article and
   b. a znPE that is present in an amount equal to the amount of second polymer component present in the article, where the density of the znPE is the same as the overall density of the second polymer component.

24. The article of claim 23, wherein the modulus of the article is at least 7 percent higher than the 1% secant flexural modulus of the comparison article.

25. The article of claim 1, wherein the article has a Notched Izod Impact Resilience at −18° C. of at least about 32 N.

* * * * *